Sept. 17, 1929.  J. E. THOMPSON  1,728,884
ROUTE INDICATING MEANS
Filed Nov. 28, 1928   2 Sheets-Sheet 1
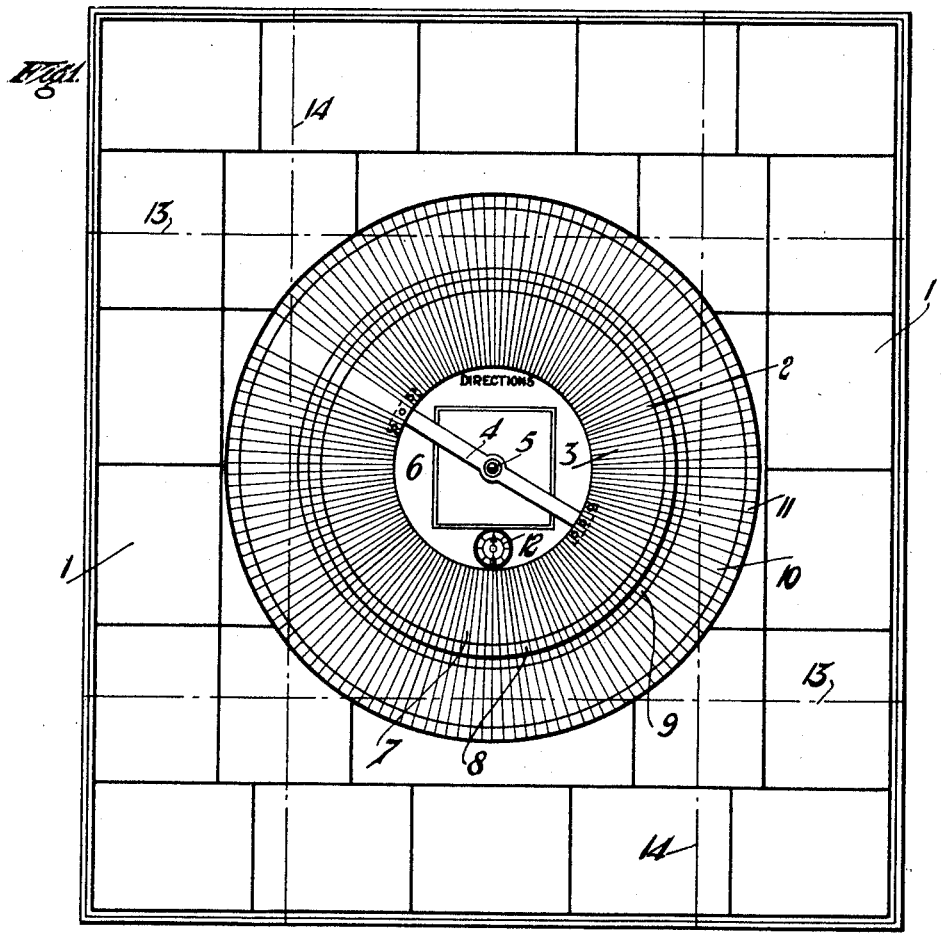
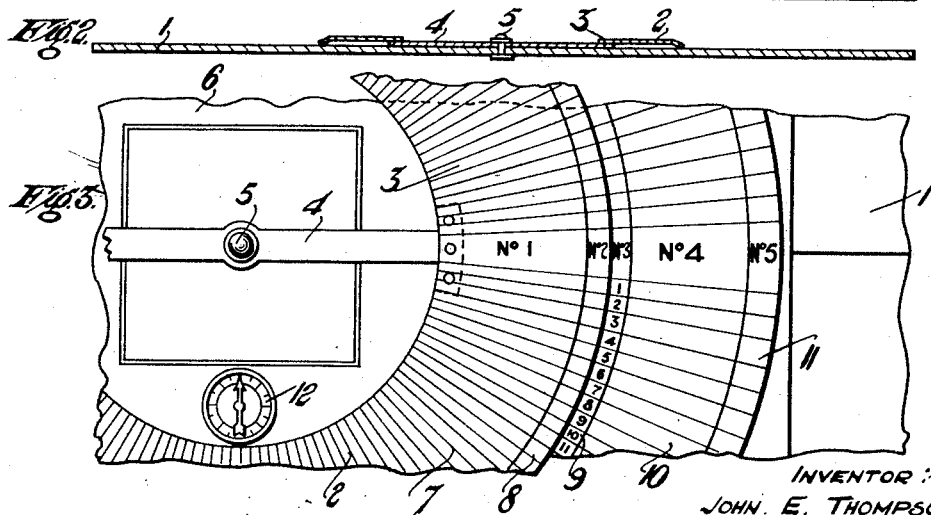
INVENTOR:—
JOHN. E. THOMPSON.
PER:— Raynor
ATTORNEYS.

Sept. 17, 1929.  J. E. THOMPSON  1,728,884

ROUTE INDICATING MEANS

Filed Nov. 28, 1928  2 Sheets-Sheet 2

Inventor.
John E. Thompson.
per. Rayner & Co
Attorneys.

Patented Sept. 17, 1929

1,728,884

UNITED STATES PATENT OFFICE

JOHN EDWARD THOMPSON, OF LONDON, ENGLAND

ROUTE-INDICATING MEANS

Application filed November 28, 1928, Serial No. 322,539, and in Great Britain January 10, 1928.

This invention relates to means for indicating the direction, distance and route between starting point and destination in journeys and the object of the invention is to provide a new or improved appliance which will enable these data to be found easily in connection with any of a number of towns or other destinations to be reached from a fixed starting point such as the town in which the user of the appliance resides.

According to the invention the appliance comprises a chart having a series of numbered indications of routes and distances to particular destinations marked in numbered spaces radiating from a central point in directions corresponding to the directions to be taken when setting out from the starting point to reach those destinations and a rotary indicator mounted to turn about the central point and bearing a list of the destinations with numbers corresponding to the numbered indications on the chart.

An example of an appliance constructed according to the invention is illustrated in the accompanying drawing in which:—

Fig. 1 is a plan.

Fig. 2 is a section, and

Fig. 3 is an enlarged fragmentary plan showing certain details of the markings on the chart.

Figure 4:
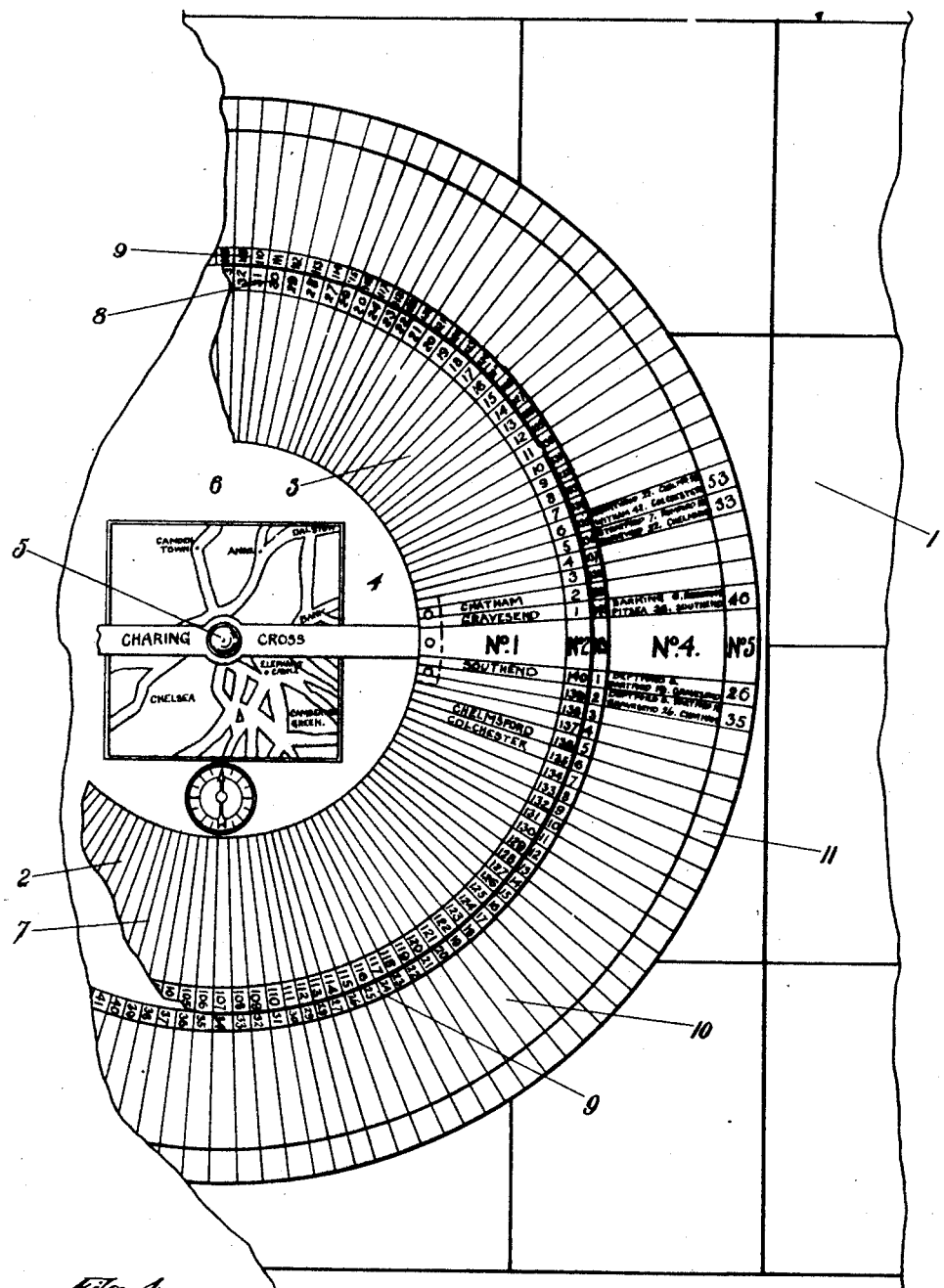
Fig. 4 is an enlarged fragmentary view in detail of a portion of Fig. 1 containing the map.

As shown in the drawings the device comprises a card, board or other base 1 carrying a rotary indicator 2 which consists of a flat ring or annular disc 3 which may be of cardboard or other suitable material carried by a cross strip 4. The strip 4 is pinned to the base 1 at the point 5 in such manner that the ring 3 with its cross strip 4 can be rotated about this point.

Within the circle enclosed by the ring 3 the base 1 shows a space 6 in which a map of a town or district from which journeys are to be made may be marked and advantageously the point 5 may mark on this map the place or neighbourhood in the town or district at which journeys are to be started.

In order to indicate the directions from the starting point to a number of destinations the ring 3 has the names of the destinations arranged in two circles so as to read alphabetically in opposite directions as indicated at 7 each destination having allotted to it a number which is marked on the ring as shown at 8.

Outside the ring 3, the base 1 bears a ring of route numbers 9 in numerical order so arranged that when the ring 3 is rotated to bring a route number on the base opposite the corresponding number allotted on the ring 3 to the required destination on ring 3, the direction to be taken when starting out for this destination will be shown in the circle 10.

Outside the ring of numbers 9 the base has the ring of spaces 10 for statements of the names of places on the routes and of the distances to these points and a ring of spaces 11 in which the total distances to the several destinations are marked.

A magnetic compass 12 may be mounted on the base 1 as shown, and the space outside the rings 10 and 11 may carry advertisements or any other matter.

Directions for the use of the appliance may be marked in the space 6 and the base 1 may be folded if desired along the lines 13 and 14 for compactness.

I claim:

1. Route indicating means comprising a base having marked thereon a plurality of consecutively numbered spaces radiating from a central point containing indications of a route and distances from a given starting point, and a rotary indicator having radial spaces containing alphabetically arranged destinations, said radial spaces being numbered to correspond with the numbers of the spaces on said base containing the appropriate routes to said destinations, and said rotary indicator being mounted so that its axis of rotation coincides with said central point and the centre of said radial spaces.

2. The combination of a map with route indicating means comprising an annular scale having its centre coinciding with a place on said map from which place routes are to be indicated, said scale having consecutively numbered radial spaces containing indications of a route and distances from said place in directions corresponding to the directions to be taken in setting out from said place by said routes, and a circular indicator mounted to rotate about said place and marked with numbered spaces containing alphabetically arranged destinations, the numbers of which correspond with the numbers of the radial spaces on said annular scale containing indications of the appropriate routes to said destinations.

3. The combination of a map with route indicating means comprising an annular scale having its centre coinciding with a place on said map from which place routes are to be indicated, said scale having consecutively numbered radial spaces containing indications of a route and distances from said place, in directions corresponding to the directions to be taken in setting out from said place by said routes, and an annular indicator having a diametrical bearing strip mounted to rotate about its center and having its axis of rotation coinciding with said place, said annular indicator having numbered sector spaces containing alphabetically arranged destinations, the numbers of which correspond with the numbers of the radial spaces on said annular scale containing indications of the appropriate routes to said destinations.

JOHN EDWARD THOMPSON.